United States Patent
Lee et al.

(10) Patent No.: US 10,824,033 B2
(45) Date of Patent: Nov. 3, 2020

(54) MIRROR CELL AND DISPLAY DEVICE COMPRISING THE SAME

(71) Applicants: LG DISPLAY CO., LTD., Seoul (KR); INDUSTRIAL COOPERATION FOUNDATION CHONBUK NATIONAL UNIVERSITY, Jeonju-si, Jeollabuk-do (KR)

(72) Inventors: Jihoon Lee, Jeonju-si (KR); Hyungmin Kim, Jeonju-si (KR); Jongyoon Kim, Jeonju-si (KR); Jonghoon Woo, Goyang-si (KR); Chiwan Kim, Goyang-si (KR); Sungeui Shin, Seoul (KR); Seongil Kim, Uijeongbu-si (KR); Jaebin Song, Seoul (KR)

(73) Assignees: LG Display Co., Ltd., Seoul (KR); Industrial Cooperation Foundation Chonbuk National University, Jeonju-Si (KR)

( * ) Notice: Subject to any disclaimer, the term of this patent is extended or adjusted under 35 U.S.C. 154(b) by 218 days.

(21) Appl. No.: 15/826,278

(22) Filed: Nov. 29, 2017

(65) Prior Publication Data
US 2018/0149919 A1 May 31, 2018

(30) Foreign Application Priority Data
Nov. 30, 2016 (KR) .................. 10-2016-0162357

(51) Int. Cl.
G02F 1/1334 (2006.01)
G02F 1/1347 (2006.01)
G02F 1/137 (2006.01)

(52) U.S. Cl.
CPC .......... G02F 1/1347 (2013.01); G02F 1/1334 (2013.01); G02F 1/13718 (2013.01); G02F 2001/13775 (2013.01)

(58) Field of Classification Search
CPC .. G02F 1/1347; G02F 1/13718; G02F 1/1334; G02F 2001/13775
See application file for complete search history.

(56) References Cited

U.S. PATENT DOCUMENTS

| | | | |
|---|---|---|---|
| 2004/0012836 A1* | 1/2004 | Li | G02F 1/1347 359/251 |
| 2017/0023826 A1* | 1/2017 | Kashima | G02F 1/1347 |

FOREIGN PATENT DOCUMENTS

| | | |
|---|---|---|
| CN | 101256329 A | 9/2008 |
| CN | 104570463 A | 4/2015 |
| CN | 104570494 A | 4/2018 |
| KR | 20120010832 A | 2/2012 |
| TW | 200931138 A | 7/2009 |

* cited by examiner

*Primary Examiner* — Thanh Nhan P Nguyen
(74) *Attorney, Agent, or Firm* — Seed IP Law Group LLP

(57) ABSTRACT

A mirror cell and a display device are disclosed. The mirror cell includes a lower substrate, which includes a lower alignment film and a lower electrode, an upper substrate, which opposes the lower substrate and includes an upper alignment film and an upper electrode, a liquid crystal layer, which is disposed between the lower alignment film and the upper alignment film and includes a cholesteric liquid crystal and a reactive liquid crystal, and a reactive layer, which is disposed between the upper alignment film and the liquid crystal layer and includes a same kind of reactive liquid crystals as the reactive liquid crystal in the liquid crystal layer.

7 Claims, 12 Drawing Sheets

(b)

P1 < P3
P2 > P4

(a)    (b)

MIRROR CELL AND DISPLAY DEVICE COMPRISING THE SAME

This application claims the priority benefit of Korean Patent Application No. 10-2016-0162357 filed on Nov. 30, 2016, which is incorporated herein by reference for all purposes as if fully set forth herein.

BACKGROUND

Technical Field

The present disclosure relates to a display device, and more specifically, to a display device including a mirror cell capable of transmitting or reflecting light.

Description of the Related Art

With the development of information society, the demand for display devices for displaying images is increasing in various forms. The display field has rapidly changed to a thin, light, and large-area flat panel display (FPD) device replacing a bulky cathode ray tube (CRT). Examples of the flat panel display device includes a liquid crystal display (LCD) device, a plasma display panel (PDP), an organic light emitting display (OLED) device, and an electrophoretic display (ED) device, etc.

Recently, techniques which can selectively use a display mode and a mirror mode by providing, in a display device, a mirror cell capable of controlling transmission and reflection of light are being developed. The representative mirror cell capable of controlling transmission and reflection of light is a liquid crystal cell. Examples of the liquid crystals to be used in the liquid crystal cell may include twisted nematic liquid crystals, smectic liquid crystals, cholesteric liquid crystals, etc. Among them, the cholesteric liquid crystal has been used in reflective display devices.

The cholesteric liquid crystal is a mixture of liquid crystals, in which a chiral dopant to induce a periodic helical structure is added, and has the property of selectively reflecting light according to the twisted direction of a helix and the pitch of a repeating structure. In particular, the wavelength of the light to be reflected is expressed as a product of the average refractive index of liquid crystals and the pitch of cholesteric liquid crystals and typical cholesteric liquid crystals reflect light at a wavelength of 50 nm. Preparing cholesteric liquid crystals with various pitches can broaden the wavelength range of the light to be reflected. Accordingly, studies for broadening the wavelength range of the light to be reflected by preparing the cholesteric liquid crystals with a wide variety of pitches are being continued.

BRIEF SUMMARY

The present disclosure provides a display device having a mirror cell capable of expanding a reflection wavelength band.

In one or more embodiments, there is provided a mirror cell comprising a lower substrate, which includes a lower alignment film and a lower electrode, an upper substrate, which opposes the lower substrate and includes an upper alignment film and an upper electrode, a liquid crystal layer, which is disposed between the lower alignment film and the upper alignment film and includes a cholesteric liquid crystal and a reactive liquid crystal, and a reactive layer, which is disposed between the upper alignment film and the liquid crystal layer and includes a same kind of reactive liquid crystals as the reactive liquid crystal in the liquid crystal layer.

The reactive layer may be formed of only the reactive liquid crystals.

The reactive layer may comprise an alignment film material and the reactive liquid crystals.

The reactive layer may be disposed in the form of a layer or pattern.

The reactive liquid crystal layer may include the reactive liquid crystals in an amount within a range from 30 wt % to 90 wt %, inclusive, relative to the reactive layer.

The reactive layer may have a thickness within a range from 0.1 μm to 3 μm, inclusive.

The mirror cell further may further comprise: a middle substrate, which is disposed between the upper substrate and the lower substrate, a first middle electrode, which is disposed on a lower surface of the middle substrate, a first middle alignment film, which is disposed on a lower surface of the first middle electrode, a second middle electrode, which is disposed on an upper surface of the middle substrate, and a second middle alignment film, which is disposed on an upper surface of the second middle electrode.

The liquid crystal layer may include a left-circularly polarized liquid crystal layer that reflects left-circularly polarized light and a right-circularly polarized liquid crystal layer that reflects right-circularly polarized light. The reactive layer may include a first reactive layer disposed on a lower surface of the first middle alignment film and a second reactive layer disposed on a lower surface of the upper alignment film, and the left-circularly polarized liquid crystal layer may be disposed between the first reactive layer and the lower alignment film and the right-circularly polarized liquid crystal layer may be disposed between the second reactive layer and the second middle alignment film.

In further embodiments, there is provided a mirror cell comprising a lower substrate, which includes a lower alignment film and a lower electrode, an upper substrate, which opposes the lower substrate and includes an upper alignment film and an upper electrode, and a liquid crystal layer, which is disposed between the lower alignment film and the upper alignment film and includes a cholesteric liquid crystal and a reactive liquid crystal, wherein the upper alignment film is disposed in contact with the liquid crystal layer includes a same kind of reactive liquid crystals as the reactive liquid crystal in the liquid crystal layer.

The upper alignment film may include the reactive liquid crystals in an amount within a range from 10 wt % to 50 wt %, inclusive, relative to the upper alignment film.

The mirror cell may further include: a middle substrate, which is disposed between the upper substrate and the lower substrate, a first middle electrode, which is disposed on a lower surface of the middle substrate, a first middle alignment film, which is disposed on a lower surface of the first middle electrode, a second middle electrode, which is disposed on an upper surface of the middle substrate, and a second middle alignment film, which is disposed on an upper surface of the second middle electrode, wherein the first middle alignment film includes the same kind of reactive liquid crystals as the reactive liquid crystal in the liquid crystal layer.

The liquid crystal layer may include a left-circularly polarized liquid crystal layer that reflects left-circularly polarized light and a right-circularly polarized liquid crystal layer that reflects right-circularly polarized light. The left-circularly polarized liquid crystal layer may be disposed between the first middle alignment film and the lower alignment film, and the right-circularly polarized liquid crystal layer may be disposed between the upper alignment film and the second middle alignment film.

In still further embodiments, there is provided a display device comprising a display panel, and a mirror cell disposed on the display panel and operable in a reflective mode and a transmissive mode. The mirror cell includes a lower substrate, which includes a lower alignment film and a lower electrode, an upper substrate, which opposes the lower substrate and includes an upper alignment film and an upper electrode, a liquid crystal layer, which is disposed between the lower alignment film and the upper alignment film and includes a cholesteric liquid crystal and a reactive liquid crystal, and a reactive layer, which is disposed between the upper alignment film and the liquid crystal layer and includes a same kind of reactive liquid crystals as the reactive liquid crystal in the liquid crystal layer.

In yet another embodiment, there is provided a display device comprising a display panel, and a mirror cell disposed on the display panel and operable in a reflective mode and a transmissive mode. The mirror cell includes a lower substrate, which includes a lower alignment film and a lower electrode, an upper substrate, which opposes the lower substrate and includes an upper alignment film and an upper electrode, and a liquid crystal layer, which is disposed between the lower alignment film and the upper alignment film and includes a cholesteric liquid crystal and a reactive liquid crystal, wherein the upper alignment film is disposed in contact with the liquid crystal layer and includes a same kind of reactive liquid crystals as the reactive liquid crystal in the liquid crystal layer.

BRIEF DESCRIPTION OF THE SEVERAL VIEWS OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings.

DETAILED DESCRIPTION

Figure 1:
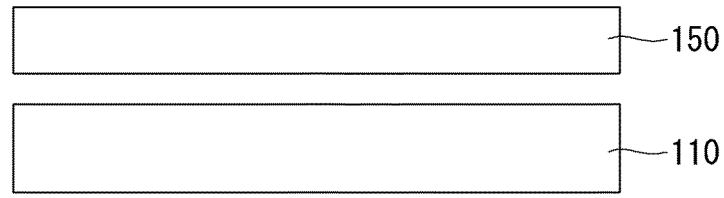
FIG. 1 shows a cross-sectional view illustrating a display device.

Hereinafter, exemplary embodiments of the present disclosure will be described in detail with reference to illustrative drawings. In adding reference numerals to the constituent elements of the drawings, it should be noted that throughout the specification the same constituting elements are denoted by the same reference symbols as possible even if they are displayed on different drawings, like reference numerals denote substantially like components. Additionally, in explaining the exemplary embodiments of the present disclosure, if it is determined that the detailed description with regard to known functions or configurations related to the disclosure may obscure the gist of the disclosure, detailed description thereof will be omitted.

In explaining the constituent elements of the disclosure, terms such as a first, a second, A, B, (a), and (b) may be used. These terms are intended to distinguish the constituent elements from other constituent elements, and the nature, order, sequence, etc., of the constituent elements are not limited by these terms. When a constituent element is described as being "linked", "coupled", or "connected" with another constituent element, it may be understood that the constituent element is directly linked, coupled, or connected to the different constituent element, but it may also be understood that the different constituent element is linked, coupled, or connected between each of the constituent elements. In the same context, when a constituent element is described as being formed "on" or "below" of a different constituent element, it should be understood to include a case where the constituent element is directly formed on the different constituent element and a case where the constituent element is indirectly formed by interposing an another different constituent element to the different constituent element.

The display panel according to the present disclosure described below may be an organic light emitting display panel, a liquid crystal display panel, an electrophoretic display panel, etc. In the present disclosure, the liquid crystal display panel is described as an exemplary embodiment. The liquid crystal display panel consists of a thin-film transistor array substrate, in which a pixel electrode and a common electrode are formed on a thin-film transistor, a color filter substrate, and a liquid crystal layer interposed between the two substrates. In such a liquid crystal display panel, the liquid crystals are driven by an electric field that is vertically or horizontally applied to the common electrode and the pixel electrode. The display panel according to the present disclosure may be an organic light emitting display panel. For example, the organic light emitting display panel includes a first electrode and a second electrode connected to a thin-film transistor, and a light emitting layer, formed of an organic material, disposed therebetween. Therefore, the holes supplied from the first electrode and the electrons supplied from the second electrode are combined in the light emitting layer to form excitons, which are hole-electron pairs, and the excitons emit light by energy generated as they return to the ground state.

Figure 2:
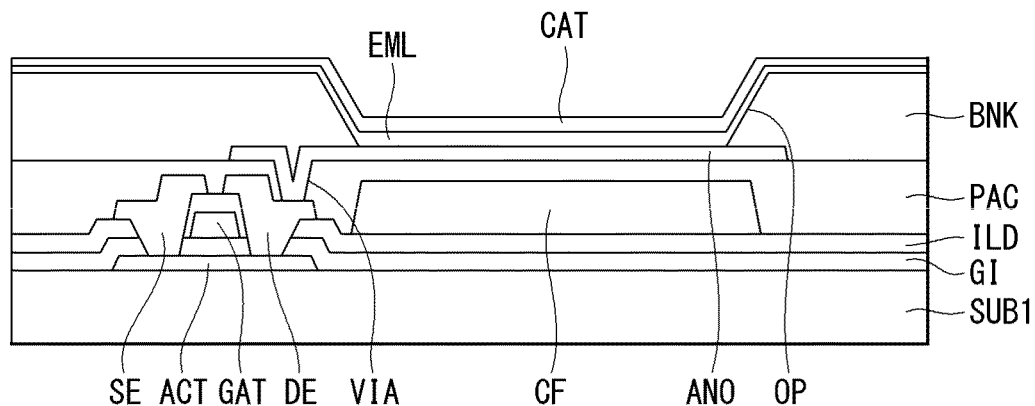
FIG. 2 shows a cross-sectional view illustrating an organic light emitting display panel.
Figure 3:
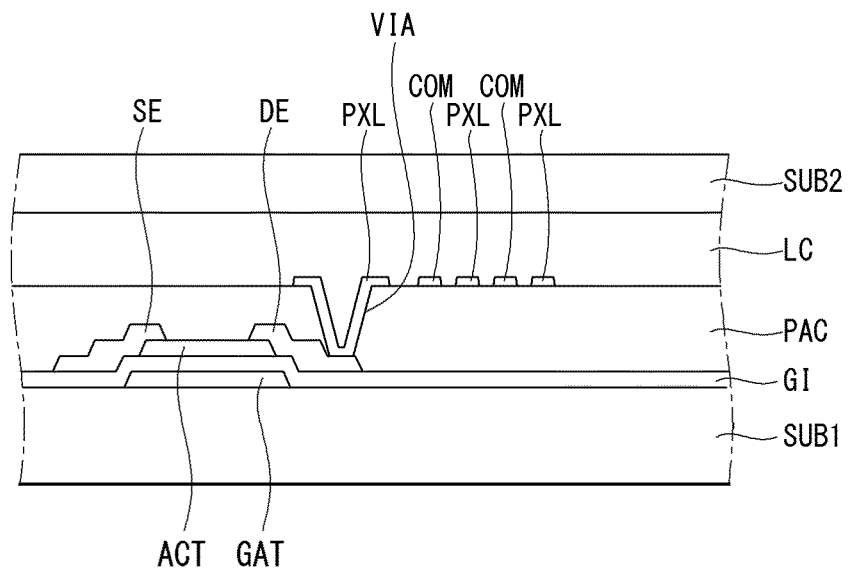
FIG. 3 shows a cross-sectional view illustrating a liquid crystal display panel.
Figure 4:
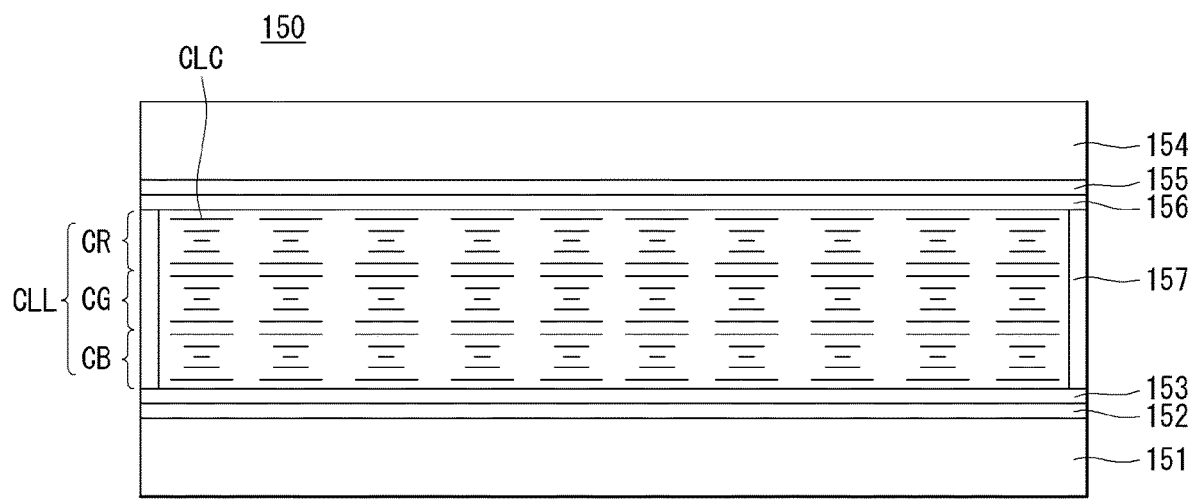
FIG. 4 shows a cross-sectional view illustrating a mirror cell.
Figure 5:
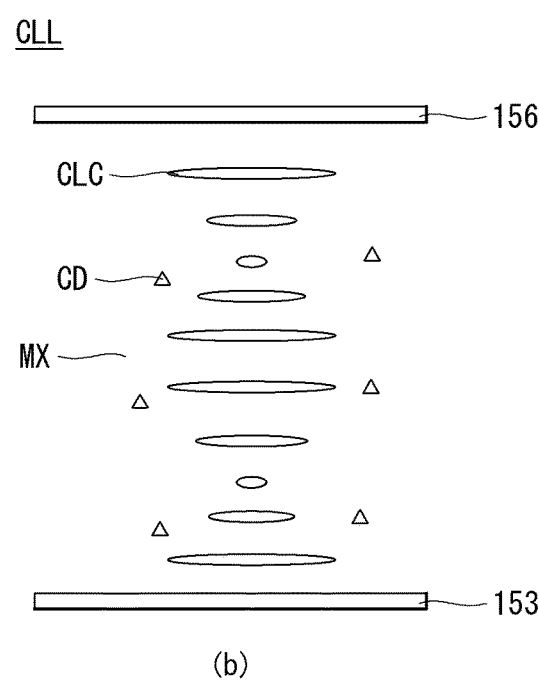
FIG. 5 shows a cross-sectional view illustrating a liquid crystal layer.
Figure 6:
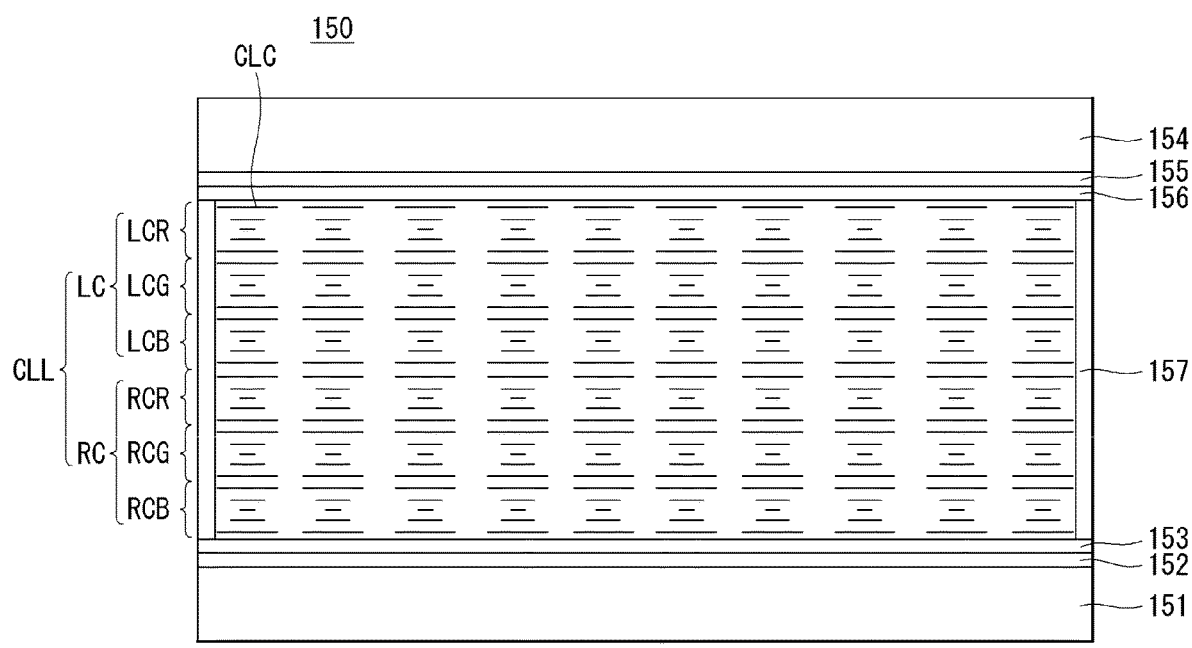
FIG. 6 shows a cross-sectional view illustrating a mirror cell provided with a multi-layered liquid crystal layer.

FIG. 1 shows cross-sectional views illustrating a display device, FIG. 2 shows a cross-sectional view illustrating an organic light emitting display panel, FIG. 3 shows a cross-sectional view illustrating a liquid crystal display panel, FIG. 4 shows a cross-sectional view illustrating a mirror cell, FIG. 5 shows a cross-sectional view illustrating a liquid crystal layer, and FIG. 6 shows a cross-sectional view illustrating a mirror cell provided with a multi-layered liquid crystal layer.

Referring to FIG. 1, a display device 100 includes a display panel 110 and a mirror cell 150 disposed on the display panel 110.

The display panel 110 displays an image and is composed of the organic light emitting display panel or the liquid crystal display panel shown in FIGS. 2 and 3, respectively. Referring to FIGS. 2 and 3, the display panel 110 will be explained as follows.

Referring to FIG. 2, when the display panel is an organic light emitting display panel, the organic light emitting display panel emits light in a plurality of subpixels to realize a full color. Taking one subpixel of the plurality of subpixels as an example, the active layer ACT is disposed on a first substrate SUB1. The active layer ACT may be formed of a silicon semiconductor or oxide semiconductor. The silicon semiconductor may include amorphous silicon or crystallized polycrystalline silicon, which in this exemplary embodiment may be an active layer ACT formed of polycrystalline silicon. The gate insulating film GI is disposed on the active layer ACT. The gate insulating film GI may be a silicon oxide ($SiO_x$), a silicon nitride ($SiN_x$), or a multilayer thereof. A gate electrode GAT is disposed on the gate insulating film GI so as to correspond to the active layer ACT. The gate electrode GAT is formed of at least one selected from the group consisting of molybdenum (Mo), aluminum (Al), chromium (Cr), gold (Au), titanium (Ti), nickel (Ni), neodymium (Nd), and copper (Cu), or an alloy thereof. Additionally, the gate electrode GAT may be a multilayer formed of one selected from the group consisting of molybdenum (Mo), aluminum (Al), chromium (Cr), gold (Au), titanium (Ti), nickel (Ni), neodymium (Nd), and copper (Cu), or an alloy thereof. For example, the gate electrode GAT may be a double layer formed of molybdenum/aluminum-neodymium or molybdenum/aluminum.

An interlayer dielectric ILD is disposed on the gate an electrode GAT. The interlayer insulating film ILD may be a silicon oxide film ($SiO_x$), a silicon nitride film ($SiN_x$), or a multilayer thereof. A source electrode SE and a drain electrode DE, which are electrically connected to the semiconductor layer ACT, are disposed on the interlayer insulating film ILD. The source electrode SE and the drain electrode DE may be a single or multiple layer. When the source electrode SE and the drain electrode DE are single layers, they may be formed of at least one selected from the group consisting of molybdenum (Mo), aluminum (Al), chromium (Cr), gold (Au), titanium (Ti), nickel (Ni), neodymium (Nd), and copper (Cu), or an alloy thereof. Additionally, when the source electrode SE and the drain electrode DE are multiple layers, they may be formed of a double layer of molybdenum/aluminum-neodymium or a triple layer of titanium/aluminum/titanium, molybdenum/aluminum/molybdenum, or molybdenum/aluminum-neodymium/molybdenum.

Accordingly, a thin film transistor including a semiconductor layer ACT, a gate electrode GAT, a source electrode SE, and a drain electrode DE is formed.

A color filter CF is disposed on the substrate SUB1 including a thin film transistor. The color filter CF has the role of converting light into red, green, and blue colors. An organic insulating film PAC is disposed on the first substrate SUB1 where the color filter CF is disposed. The organic insulating film PAC may be a planarized film for alleviating the step of a lower structure and is formed of an organic material such as polyimide, benzocyclobutene series resin, acrylate, etc. The organic insulating film PAC includes a via hole VIA for exposing the drain electrode DE.

A first electrode ANO is disposed on the organic insulating film PAC. The first electrode ANO is an anode and is formed of a transparent conductive layer such as ITO, IZO, etc., which has a high work function. When the first electrode ANO is a reflective electrode, a reflective layer may be included under the transparent conductive layer. The first electrode ANO fills in the via hole VIA and is connected to the drain electrode DE.

A bank layer BNK is disposed on the substrate SUB1 including a first electrode ANO. The bank layer BNK may be a pixel defining film that defines a pixel by exposing a portion of the first electrode ANO. The bank layer BNK is formed of an organic material such as polyimide, benzocyclobutene series resin, acrylate, etc. The bank layer BNK is provided with an opening OP that exposes the first electrode ANO.

An organic layer EML is disposed on the bank layer BNK. The organic layer EML is a layer in which electrons and holes are combined to emit light and it includes at least a light emitting layer. Additionally, the organic layer EML may include at least one selected from the group consisting of a hole injection layer, a hole transport layer, an electron transport layer, and an electron injection layer, and at least any one of them may be omitted. A second electrode CAT is disposed on the first substrate SUB1 where the organic layer EML is formed. The second electrode CAT is a cathode electrode and it may be formed of magnesium (Mg), calcium (Ca), aluminum (Al), or silver (Ag), which have a low work function, or an alloy thereof. The second electrode CAT may be formed thin to allow transmission of light and act as a transmitting electrode or formed thick to reflect light and act as a reflective electrode. That is, an organic light emitting diode including a first electrode ANO, an organic layer EML, and a second electrode CAT is included. Although not shown, an encapsulation layer of an inorganic or organic film that encapsulates the underlying elements on top of the second electrode CAT may be further included. Accordingly, the white light emitted from the organic layer EML is converted into red, green, and blue through the color filter CF to realize a full-color image.

Meanwhile, referring to FIG. 3, the display panel of the present disclosure may be a liquid crystal display panel. The liquid crystal display panel has a gate electrode GAT on the first substrate SUB1 and a gate insulating film GI for insulating the gate electrode GAT is disposed on the gate electrode GAT. An active layer ACT is disposed on the gate insulating film GI, and a source electrode SE in contact with one side of the active layer ACT and a drain electrode DE in contact with the other side of the active layer ACT are disposed. Accordingly, a thin film transistor including a gate electrode GAT, an active layer ACT, a source electrode SE, and a drain electrode DE is formed.

An organic insulating film PAC is disposed on the first substrate SUB1 containing a thin film transistor. The organic insulating film PAC includes a via hole VIA that exposes the drain electrode DE. A pixel electrode PXL and a common electrode COM are disposed on the organic insulating film PAC. The pixel electrode PXL is connected to the drain electrode DE through a via hole VIA formed in the organic insulating film PAC. The electrode PXL and a common electrode COM are alternately arranged to form a horizontal electric field between the pixel electrode PXL and the common electrode COM.

A second substrate SUB2 opposing the first substrate SUB1 is disposed. The second substrate SUB2) may be a color filter array substrate and a color filter may be disposed. However, the present disclosure is not limited thereto, and the color filter may be disposed on the first substrate SUB1. A liquid crystal layer LC is disposed between the first substrate SUB1 and the second substrate SUB2. In an exemplary embodiment of the present disclosure, an in-plane switching (IPS) liquid crystal display device, in which the pixel electrode and the common electrode are disposed on the same plane, is described as an exemplary embodiment. However, the present disclosure is not limited thereto, and the common electrode may be disposed under the pixel electrode PXL and the common electrode may be disposed on the second substrate SUB2.

The display device 100 is provided with a mirror cell 150 on the display panel 110 described above. Hereinafter, the mirror cell 150 will be described in detail.

Referring to FIG. 4, the mirror cell 150 is formed such that a liquid crystal layer CLL is sealed between a lower substrate 151 provided with a lower electrode 152 and an upper substrate 154 provided with an upper electrode 155, with a sealing material 157.

The lower substrate 151 and the upper substrate 154 may be transparent substrates through which light can be transmitted, for example, a glass substrate or plastic substrate. Examples of the plastic substrate may include a cellulose resin such as triacetyl cellulose (TAC) and diacetyl cellulose (DAC); an acrylic resin such as cyclic olefin polymer (COP) (e.g., a norbornene derivative), cyclic olefin copolymer (COC), and polymethylmethacrylate (PMMA); polyolefins such as polycarbonate (PC), polyethylene (PE), and polypropylene (PP); polyesters such as polyvinyl alcohol (PVA), poly ether sulfone (PES), polyetheretherketone (PEEK), polyetherimide (PEI), polyethylenenaphthalate (PEN), and polyethyleneterephthalate (PET); polyimide PI, polysulfone (PSF); a fluorine resin, etc.

The lower electrode 152 and the upper electrode 155 may be formed of a transparent conductive material capable of transmitting light, for example, ITO, IZO, ITZO, IGO, etc. A lower alignment film 153 is disposed on the surface of the lower electrode 152 and an upper alignment film 156 is disposed on the surface of the upper electrode 155. The lower alignment film 153 and the upper alignment film 156 are disposed to oppose with each other and a liquid crystal layer CLL is disposed between the alignment films 153 and 156. The lower alignment film 153 and the upper alignment film 156 are formed of polyimide to align a cholesteric liquid crystal CLC contained in the liquid crystal layer CLL.

Referring to FIG. 5, the liquid crystal layer CLL includes a cholesteric liquid crystal CLC, a chiral dopant CD, and a matrix MX. Additionally, the liquid crystal layer CLL may further contain an additive such as a photoinitiator.

The cholesteric liquid crystal CLC has the property of selectively reflecting light according to the twisted direction of a helix and the pitch of a repeating structure. Therefore, by adjusting the pitch of cholesteric liquid crystals, the color of the reflected light can be controlled variously. For the formation of the pitch of the cholesteric liquid crystals in various ways, the pitch of the liquid crystals may be controlled by adjusting the amount of UV light irradiated to the cholesteric liquid crystals or by adjusting the concentration of the chiral dopant CD.

The liquid crystal layer CLL may include a matrix MX in which cholesteric liquid crystals CLC and a chiral dopant CD are dispersed. The matrix MX fixes the cholesteric liquid crystals CLC in the liquid crystal layer CLL. The matrix MX is a transparent material and is not particularly limited as long as it is a material through which UV, etc., can be transmitted. The matrix MX may be at least one selected from, for example, polyvinyl alcohol, gelatin, formalin resorcinol resin, polyurethane, (meth)acrylic acid, melamine, formaldehyde, and fluorinated polyvinylpyrrolidone. In the liquid crystal layer CLL, the cholesteric liquid crystals CLC may be contained in the liquid crystal layer CLL in an amount of 30 wt % to 70 wt % and the matrix MX may be contained in an amount of 30 wt % to 70 wt %.

Meanwhile, for increasing the reflectance of the mirror cell 150, it is necessary to reflect left-circularly polarized light and right-circularly polarized light in addition to the visible light wavelength band. Left-circularly polarized light and right-circularly polarized light may be reflected by varying the twisted direction of the cholesteric liquid crystals. Accordingly, a liquid crystal layer capable of reflecting the visible light wavelength band of the left-circularly polarized light and right-circularly polarized light is formed.

As shown in FIG. 6, a left-circularly polarized liquid crystal layer LC is formed by stacking a red liquid crystal layer LCR capable of reflecting light of a left-circularly polarized red wavelength band, a green liquid crystal layer LCG capable of reflecting the light of a left-circularly polarized green wavelength band, and a blue liquid crystal layer LCB capable of reflecting light of a left-circularly polarized blue wavelength band. Additionally, a right-circularly polarized liquid crystal layer RC is formed by stacking a red liquid crystal layer RCR capable of reflecting the light of a right-circularly polarized red wavelength band, a green liquid crystal layer RCG capable of reflecting the light of a right-circularly polarized green wavelength band, and a right-circularly polarized blue wavelength light RCB layer. Accordingly, the reflectance of the mirror cell 150 can be improved by forming a liquid crystal layer CLL by stacking the right-circularly polarized liquid crystal layer RC and the left-circularly polarized liquid crystal layer LC.

A display device having the mirror cell 150 maintains a reflective mode when an electric field is not applied (i.e., at normal conditions) while all the cholesteric liquid crystals will stand and act as a transmissive mode when an electric field is applied. Accordingly, a mirror cell can be realized by switching the reflective mode and the transmissive mode.

In order to realize the mirror cell 150 having a neutral reflection color, at least 6 liquid crystal layers must be stacked. However, when the mirror cell is constituted as described above, the structure and the process become complicated due to the stacking structure, the driving voltage, production cost, and cell gap are increased, thus making it difficult to realize a thin form.

The present disclosure provides a display device capable of simplifying the structure of a mirror cell according to an embodiment of the present disclosure.

Figure 7:
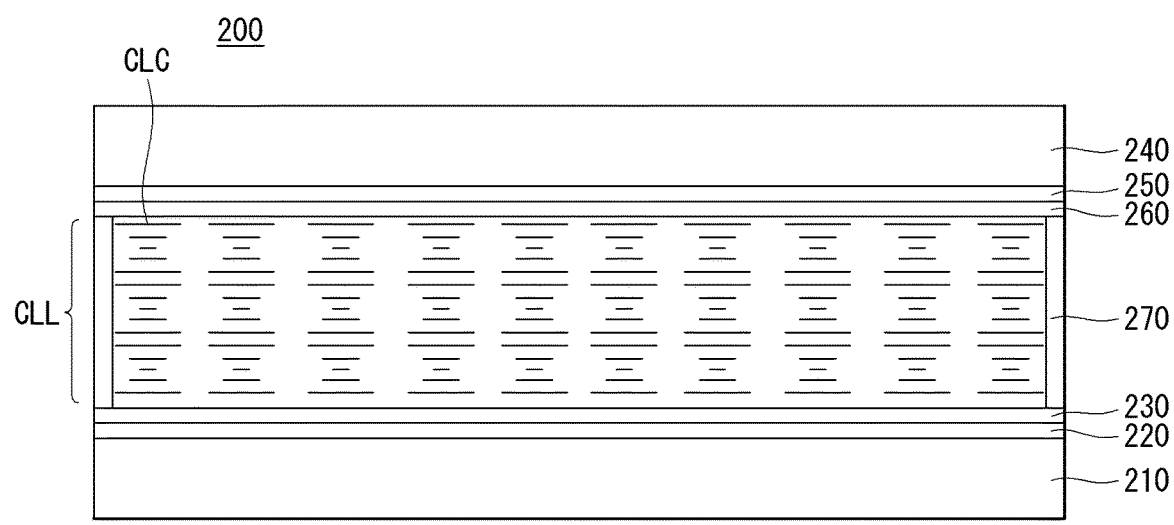
FIG. 7 shows a cross-sectional view illustrating a mirror cell according to an exemplary embodiment of the present disclosure.
Figure 8:
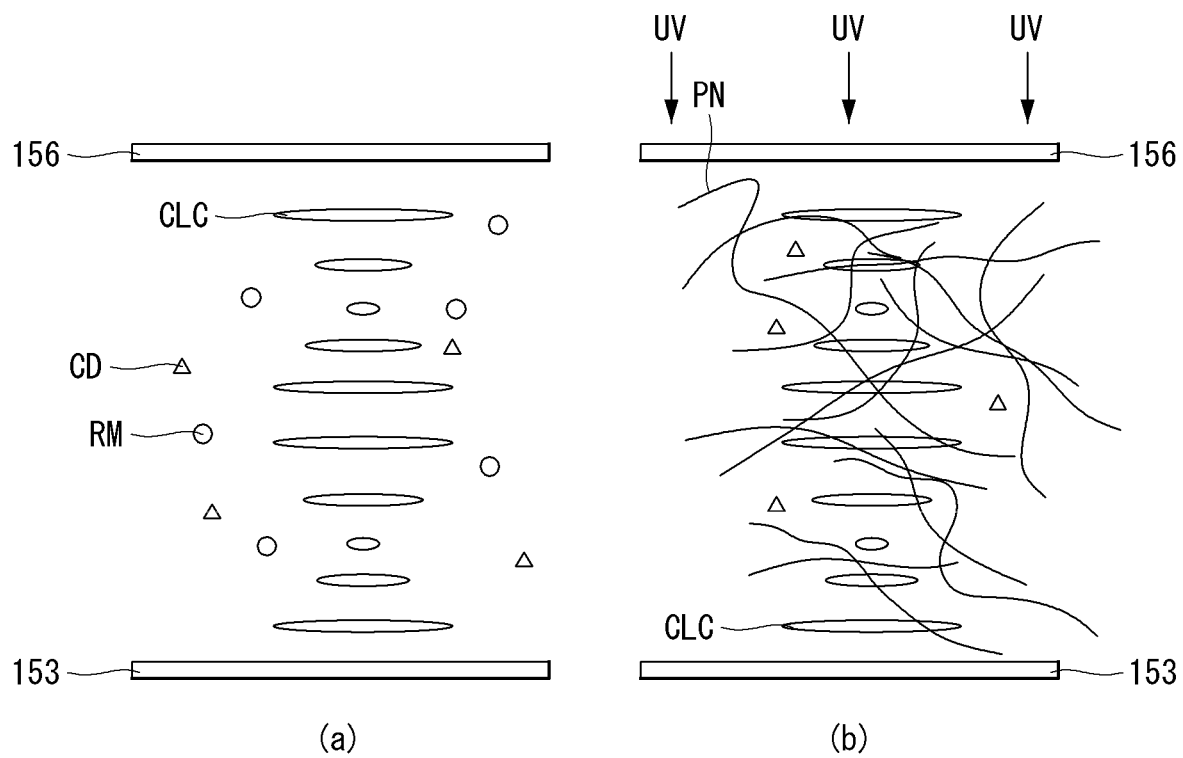
FIG. 8 shows cross-sectional views illustrating a liquid crystal layer of the present disclosure.
Figure 9:
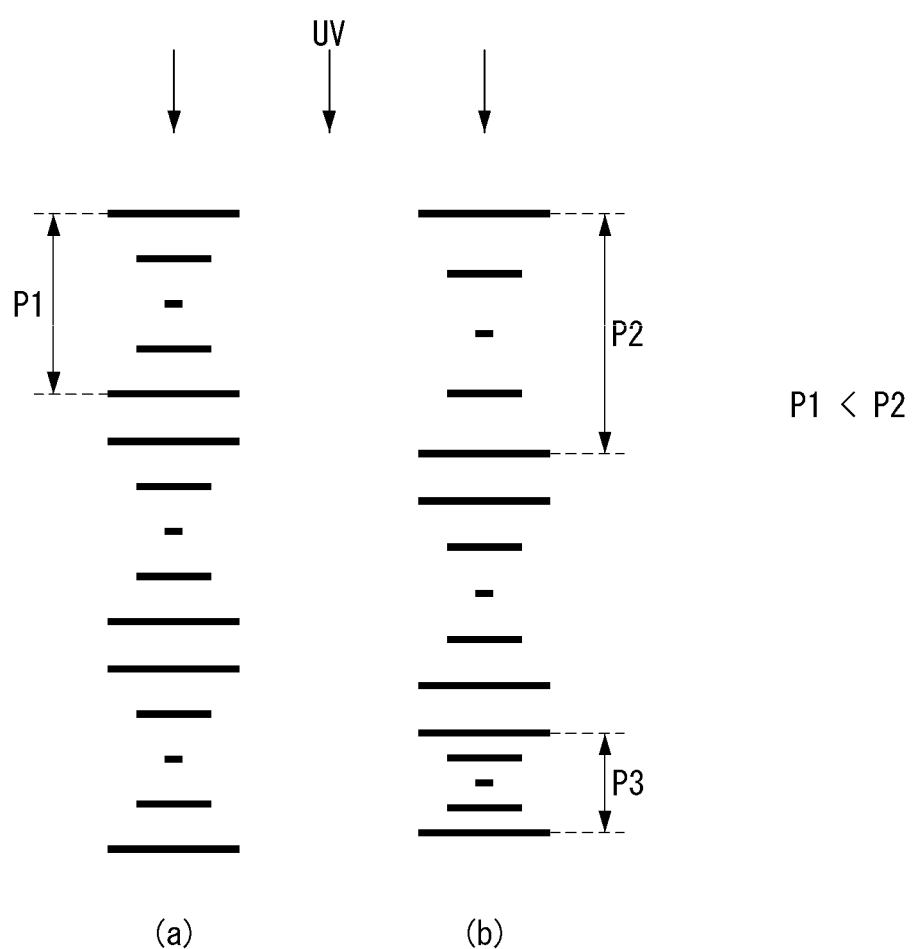
FIG. 9 shows a schematic diagram illustrating a pitch formation mechanism of a cholesteric liquid crystal.
Figure 10:
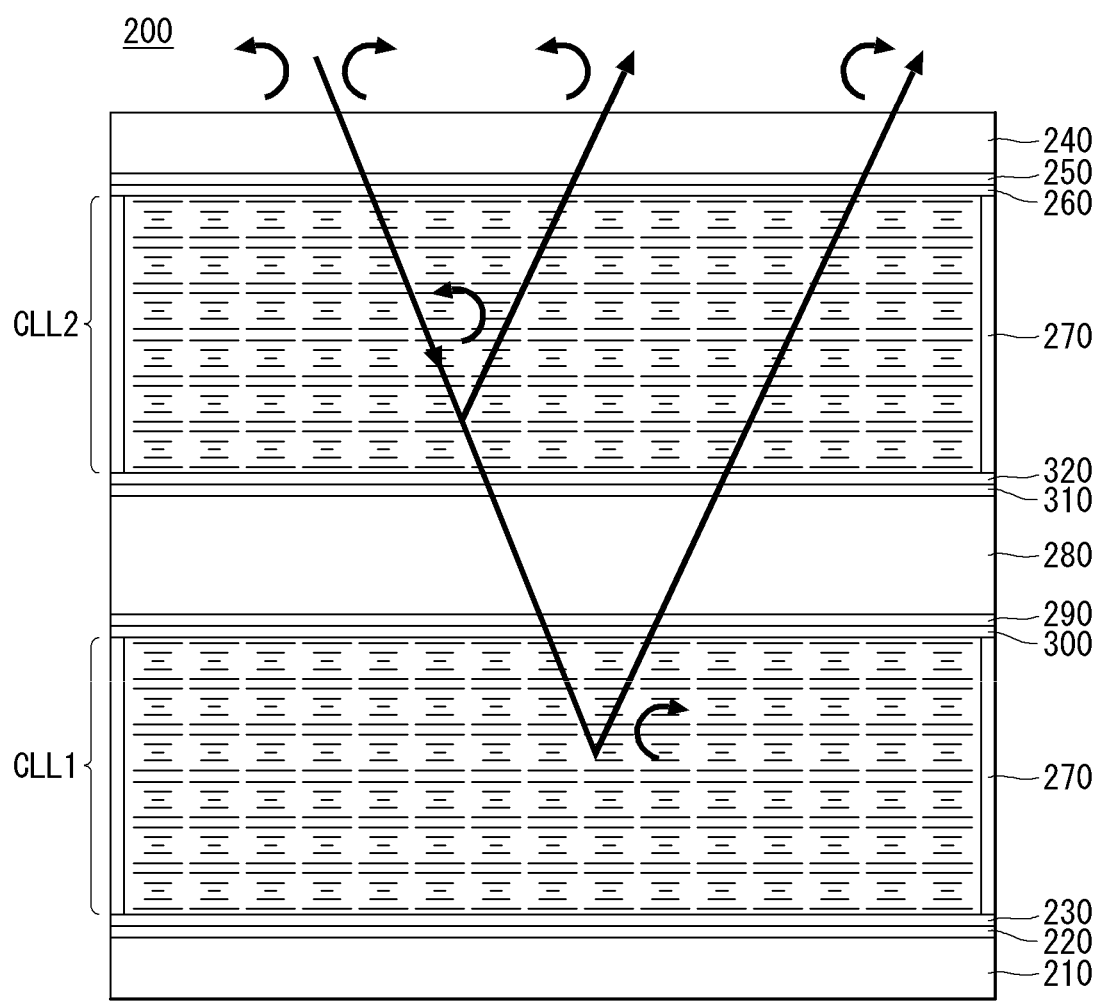
FIG. 10 shows cross-sectional views illustrating a mirror cell according to an exemplary embodiment of the present disclosure.

FIG. 7 shows a cross-sectional view illustrating a mirror cell according to an exemplary embodiment of the present disclosure; FIG. 8 shows cross-sectional views illustrating a liquid crystal layer of the present disclosure; FIG. 9 shows a schematic diagram illustrating a pitch formation mechanism of a cholesteric liquid crystal; and FIG. 10 shows cross-sectional views illustrating a mirror cell according to an exemplary embodiment of the present disclosure. The description of the same components as those of the above-described mirror cell will be omitted.

Referring to FIG. 7, in the mirror cell 200 of the present disclosure, a lower electrode 220 is disposed on a lower substrate 210 and a lower alignment film 230 is disposed on a lower electrode 220. An upper electrode 250 is disposed on the lower surface of the upper substrate 240 and an upper alignment film 260 is disposed on the lower surface of the upper electrode 250. The liquid crystal layer CLL is disposed between the lower alignment film 230 and the upper alignment film 260 and is sealed with a sealing substance 270.

The liquid crystal layer CLL of the present disclosure includes cholesteric liquid crystals CLC. More specifically, referring to FIG. 8, the liquid crystal layer CLL of the present disclosure includes a cholesteric liquid crystal CLC, a chiral dopant CD, and a reactive liquid crystal RM.

The reactive liquid crystal RM maintains the alignment of the cholesteric liquid crystals CLC and expands the reflection band by variously forming the pitch of the cholesteric liquid crystals CLC. The reactive liquid crystals RM, although not aligned by an electric field, contains a polymer liquid crystal can be cured by UV light, and can maintain the alignment of the liquid crystal as the physical properties of the reactive liquid crystals RM vary after curing compared to those before curing.

As shown in FIG. 8, before irradiation with UV light, the reactive liquid crystals RM are mixed in the cholesteric liquid crystals CLC (FIG. 8(a)). When UV light is irradiated, the reactive liquid crystals RM are cured to form a polymer network (PN) to maintain alignment of the liquid crystal (FIG. 8(b)). The liquid crystal layer CLL containing the reactive liquid crystals RM has a localized difference in the degree of curing of the reactive liquid crystals RM, and the degree of twist of the cholesteric liquid crystals CLC is gradientized. Accordingly, the reflection band of the cholesteric liquid crystals CLC can be expanded.

The reactive liquid crystals RM can use methacrylate-based and acrylate-based materials. Examples of the methacrylate-based materials may include methyl methacrylate (MMA), ethyl methacrylate (EMA), n-Butyl methacrylate (BMA), 2-aminoethyl methacrylate hydrochloride, allyl methacrylate, benzyl methacrylate, 2-butoxyethyl methacrylate, 2-(fe/f-butylamino)ethyl methacrylate, butyl methacrylate, te/f-butyl methacrylate, caprolactone 2-(methacryloyloxy)ethyl ester, 3-chloro-2-hydroxypropyl methacrylate, cyclohexyl methacrylate, 2-(diethylamino)ethyl methacrylate, di(ethylene glycol) methyl ether methacrylate, 2-(dimethylamino)ethyl methacrylate, 2-ethoxyethyl methacrylate, ethylene glycol dicyclopentenyl ether methacrylate, ethylene glycol methyl ether methacrylate, ethylene glycol phenyl ether methacrylate, 2-ethylhexyl methacrylate, furfuryl methacrylate, glycidyl methacrylate, glycosyloxy ethyl methacrylate, hexyl methacrylate, hydroxybutyl methacrylate, 2-hydroxyethyl methacrylate, 2-hydroxyethyl methacrylate, hydroxypropyl methacrylate, a mixture of hydroxypropyl and hydroxyisopropyl methacrylates, 2-hydroxypropyl 2-(methacryloyloxy)ethyl phthalate, isobornyl methacrylate, isobutyl methacrylate, 2-isocyanatoethyl methacrylate, isodecyl methacrylate, lauryl methacrylate, methacryloyl chloride, methacrylic acid, 2-(methylthio) ethyl methacrylate, mono-2-(methacryloyloxy)ethyl maleate, mono-2-(methacryloyloxy)ethyl succinate, pentabromophenyl methacrylate, phenyl methacrylate, phosphoric acid 2-hydroxyethyl methacrylate ester, stearyl methacrylate, 3-sulfopropyl methacrylate potassium salt, tetrahydrofurfuryl methacrylate, 3-(trichlorosilyl)propyl methacrylate, tridecyl methacrylate, 3-(trimethoxysilyl)propyl methacrylate, 3,3,5-trimethylcyclohexyl methacrylate, trimethylsilyl methacrylate, and vinyl methacrylate.

Examples of the acrylate-based materials may include acrylic acid, 4-acryloylmorpholine, [2-(acryloyloxy)ethyl] trimethylammonium chloride, 2-(4-benzoyl-3-hydroxyphenoxy)ethyl acrylate, benzyl 2-propylacrylate, 2-butoxyethyl acrylate, butyl acrylate, fe/f-butyl acrylate, 2-[(butylamino) carbonyl]oxy]ethyl acrylate, ferf-butyl 2-bromoacrylate, 4-tert-butylcyclohexyl acrylate, 2-Carboxyethyl acrylate, 2-carboxyethyl acrylate oligomers anhydrous, 2-(diethylamino)ethyl acrylate, di(ethylene glycol) ethyl ether acrylate technical grade, di(ethylene glycol) 2-ethylhexyl ether acrylate, 2-(dimethylamino)ethyl acrylate, 3-(dimethylamino) propyl acrylate, dipentaerythritol penta-/hexa-acrylate, 2-ethoxyethyl acrylate, ethyl acrylate, 2-ethylacryloyl chloride, ethyl 2-(bromomethyl)acrylate, ethyl cis-(-cyano)acrylate, ethylene glycol dicyclopentenyl ether acrylate, ethylene glycol methyl ether acrylate, ethylene glycol phenyl ether acrylate, ethyl 2-ethylacrylate, 2-ethylhexyl acrylate, ethyl 2-propylacrylate, ethyl 2-(trimethylsilylmethyl)acrylate, hexyl acrylate, 4-hydroxybutyl acrylate, 2-hydroxyethyl acrylate, 2-hydroxy-3-phenoxypropyl acrylate, hydroxypropyl acrylate, isobornyl acrylate, isobutyl acrylate, isodecyl acrylate, isooctyl acrylate, lauryl acrylate, methyl 2-acetamidoacrylate, methyl acrylate, methyl a-bromoacrylate, methyl 2-(bromomethyl)acrylate, methyl 3-hydroxy-2-methylenebutyrate, octadecyl acrylate, pentabromobenzyl acrylate, pentabromophenyl acrylate, poly(ethylene glycol) methyl ether acrylate, poly(propylene glycol) acrylate, poly (propylene glycol) methyl ether acrylate soybean oil, epoxidized acrylate, 3-sulfopropyl acrylate potassium salt, tetrahydrofurfuryl acrylate, 3-(trimethoxysilyl)propyl acrylate, and 3,5,5-trimethylhexyl acrylate. However, the present disclosure is not limited thereto and all known reactive liquid crystal materials may be used.

Referring to FIG. 9, the mechanism of a liquid crystal layer (a) not containing reactive liquid crystals and a liquid crystal layer (b) containing reactive liquid crystals may be reviewed as follows. The liquid crystal layer (a) not containing reactive liquid crystals is present in the form of a mixture of cholesteric liquid crystals and a chiral dopant. When irradiated with UV light, a twist of the cholesteric liquid crystals is formed and the pitch P1 of all cholesteric liquid crystals are formed in the same manner.

On the other hand, the liquid crystal layer (b) containing a reactive liquid crystal is uniformly mixed with cholesteric liquid crystals, reactive liquid crystals, and a chiral dopant. When UV light is irradiated, reactive liquid crystals start to be cured in a region where UV light is incident, and reactive liquid crystals are concentrated in a region where the curing of reactive liquid crystals occurs. Therefore, the concentration of the reactive liquid crystals decreases from the region where UV light is incident to the region where UV light is emitted. Additionally, the chiral dopant is pushed away by reactive liquid crystals, and the concentration of the chiral dopant increases from the region where UV light is incident to the region where UV light is emitted. The twist of cholesteric liquid crystals depends on the concentration of the chiral dopant. When the concentration of chiral dopant increases, the cholesteric liquid crystal becomes more twisted and the pitch becomes narrower, whereas when the chiral dopant concentration is decreased, the cholesteric liquid crystals become less twisted and the pitch becomes wider. As a result, since the region where the UV light is incident has a low concentration of the chiral dopant, the pitch P2 of the cholesteric the liquid crystals is wide, and the region where UV light is emitted has a high concentration of the chiral dopant, and thus the pitch P3 of the cholesteric liquid crystals is narrow.

A comparison between the pitch of the cholesteric liquid crystals of a liquid crystal layer (a) not containing reactive liquid crystals and the pitch of the cholesteric liquid crystals of a liquid crystal layer (b) containing a reactive liquid crystal is as follows. The pitch P2 of the cholesteric liquid crystals containing reactive liquid crystals in the region where UV light is incident is wider than the pitch P1 of the cholesteric liquid crystals (a) not containing reactive liquid crystals. Additionally, the pitch P3 of the cholesteric liquid crystals (b) containing the reactive liquid crystals in a region where UV light is emitted is narrower than the pitch P1 of the cholesteric liquid crystals not containing reactive liquid crystals. Therefore, the reflection wavelength band according to the pitch of a cholesteric liquid crystal of a liquid crystal layer (b) containing reactive liquid crystals becomes wider. That is, the liquid crystal layer CLL of the present disclosure can expand the light reflection wavelength band by varying the pitch of a cholesteric liquid crystal by further including the reactive liquid crystals RM. Therefore, the mirror cell of the present disclosure can reflect all wavelengths of visible light in a single a liquid crystal layer by varying the pitch of the cholesteric liquid crystals.

Meanwhile, in the present disclosure, it is necessary to reflect left-circularly polarized light and right-circularly polarized light in order to increase the reflectance of the mirror cell 200.

Referring to FIG. 10, in the mirror cell 200 of the present disclosure, the lower electrode 220 and the lower alignment film 230 are disposed on the lower substrate 210. A middle substrate 280 opposing the lower substrate 210 is disposed and a first middle electrode 290 is disposed on the lower surface of the middle substrate 280, and a first middle alignment film 300 is disposed on the lower surface of the first middle electrode 290. A left-circularly polarized liquid crystal layer CLL1 capable of reflecting a left-circularly polarized light is disposed between the lower substrate 210 and the middle substrate 280, and is sealed with a sealing material 270.

A second middle electrode 310 is disposed on the upper surface of the middle substrate 280 and a second middle alignment film 320 is disposed on a second middle electrode 310. An upper substrate 240 opposing the middle substrate 280 is disposed. An upper electrode 250 is disposed on the lower surface of the upper substrate 240 and an upper alignment film 260 is disposed on the lower surface of the upper electrode 250. A right-circularly polarized liquid crystal layer CLL2 capable of reflecting right-circularly polarized light between the middle substrate 280 and the upper substrate 240 is sealed with the sealing material 270.

The mirror cell 200 reflects all of the right-circularly polarized light in the right-circularly polarized liquid crystal layer CLL2 and reflects all of the left-circularly polarized light in the left-circularly polarized liquid crystal layer CLL1 by constituting a mirror cell 200 having the right-circularly polarized liquid crystal layer CLL2 and the left-circularly polarized liquid crystal layer CLL1. Accordingly, a mirror cell having a neutral reflection color can be realized and the stacking structure can be simplified, thereby reducing driving voltage, production cost, and cell gap, thereby realizing a thin shape.

Figure 11:
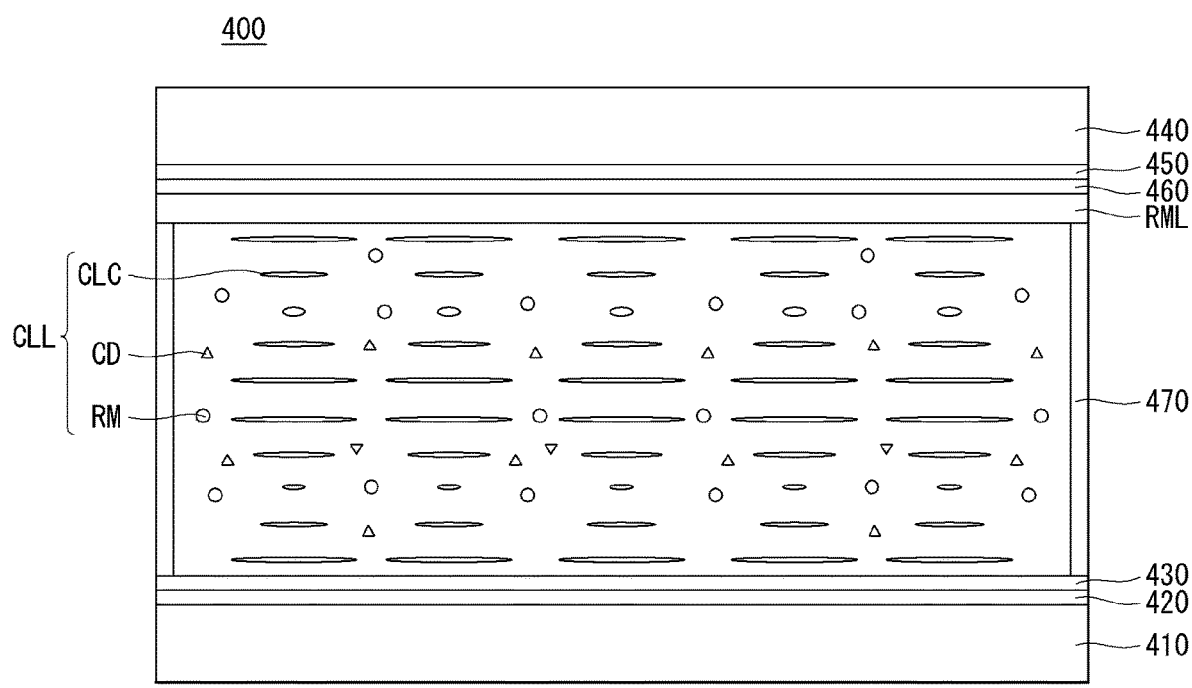
FIGS. 11 and 12 show cross-sectional views illustrating mirror cells according to other exemplary embodiments of the present disclosure.
Figure 12:
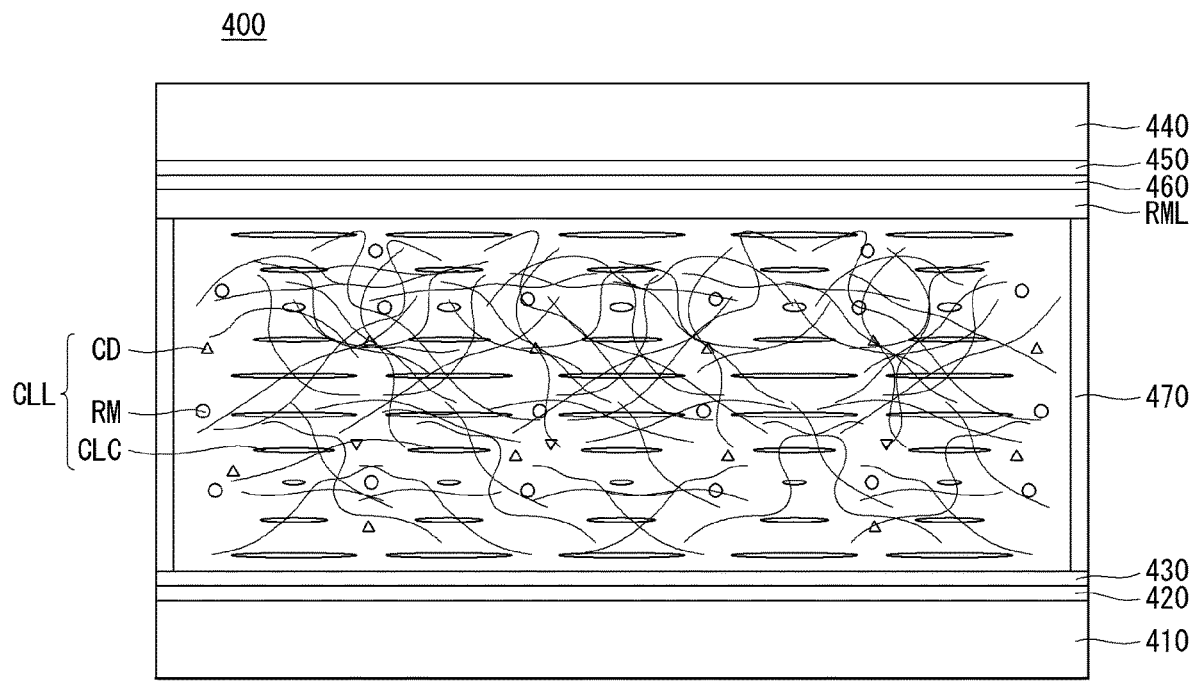
Figure 13:
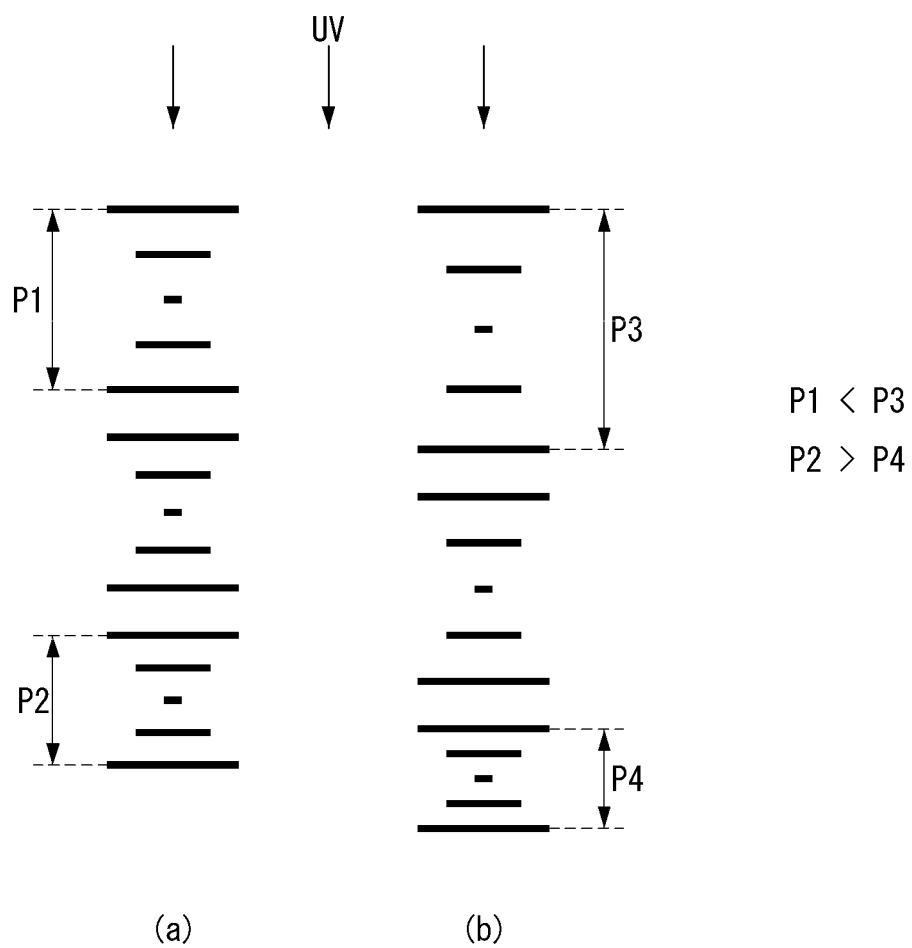
FIG. 13 shows schematic diagrams illustrating pitch formation mechanisms of cholesteric liquid crystals of the present disclosure.

FIGS. 11 and 12 show cross-sectional views illustrating mirror cells according to other exemplary embodiments of the present disclosure; FIG. 13 shows schematic diagrams illustrating pitch formation mechanisms of a cholesteric liquid crystal of the present disclosure; FIGS. 14 to 17 show various structures illustrating a reactive layer of the present disclosure; and FIG. 18 shows a cross-sectional view illustrating a mirror cell having a two-layered structure according to another exemplary embodiment of the present disclosure. Herein below, the same components as those of the above-described mirror cell will be omitted.

Referring to FIG. 11, the mirror cell 400 of the present disclosure includes a lower electrode 420 disposed on a lower substrate 410 and a lower alignment film 430 disposed on a lower electrode 420. An upper electrode 450 is disposed on the lower surface of an upper substrate 440 and an upper alignment film 460 is disposed on the lower surface of the upper electrode 450. A liquid crystal layer CLL is disposed between the lower alignment film 430 and the upper alignment film 460 and sealed with a sealing material 470. The liquid crystal layer CLL includes cholesteric liquid crystals CLC, a chiral dopant CD, and reactive liquid crystals RM.

Referring to FIG. 12, the present disclosure further includes a reactive layer RML disposed between the liquid crystal layer CLL and the upper alignment film 460. The reactive layer RML serves to further gather the reactive liquid crystals RM dispersed in the liquid crystal layer CLL into the reactive layer RML and is formed of the same material as the reactive liquid crystal RM. The reactive liquid crystal RM will have a good affinity for the reactive layer RML when the reactive liquid crystal RM is formed of the same material as the reactive liquid crystals RM and thus they are assembled into the reactive layer RML. Accordingly, the reactive liquid crystals RM can well form a polymer network in an upper part adjacent to the reactive layer RML.

When the reactive liquid crystals RM gather further at the upper part adjacent to the reactive layers RML to form a polymer network, a chiral dopant CD is relatively pushed further downward and thus the concentration of the chiral dopant CD is further diluted. When the concentration of chiral dopant CD is diluted, the cholesteric liquid crystals CLC become less twisted thus widening the pitch P. In a lower part relatively adjacent to the lower alignment film 430, the concentration of chiral dopant CD increases and the cholesteric liquid crystals CLC become more twisted thus narrowing the pitch P. Accordingly, the cholesteric liquid crystals CLC of the liquid crystal layer CLL have the advantage in that they can narrow the pitch at the upper part while widening the pitch at the lower part, thus further expanding the reflection wavelength band.

Referring to FIG. 13, (a) shows cholesteric liquid crystals of a mirror cell in which a reactive layer is not formed, and (b) shows cholesteric liquid crystals of a mirror cell in which a reactive layer is formed.

When a mirror cell, where a reactive layer is not formed, is irradiated with UV light, the reactive liquid crystals begin to cure at the top where UV light is radiated and the reactive liquid crystals gather to form a polymer network. When the reactive liquid crystals gather on the upper part, the relative chiral dopant is pushed downward. Accordingly, the pitch P1 of the cholesteric liquid crystals in the region where UV light is incident are formed wide while the pitch P2 of the cholesteric liquid crystals in the region where UV light is emitted are formed narrow.

When a mirror cell, where a reactive layer is formed, is irradiated with UV light, likewise, the reactive liquid crystals begin to cure at the top of the UV light and the reactive liquid crystals gather to form a polymer network. In particular, when the reactive layer is disposed on the upper part, reactive liquid crystals, which have a higher affinity for the reactive layer, gather further to the reactive layer. When more of the reactive liquid crystals are present on the upper part of the liquid crystal layer having a reactive layer to form a polymer network, the chiral dopant is relatively pushed further downward and the concentration of the chiral dopant on the upper part becomes further diluted. Accordingly, the cholesteric liquid crystals disposed on the upper part of the liquid crystal layer, where the concentration of the chiral dopant is diluted, becomes less twisted thus widening the pitch P3. The cholesteric liquid crystals disposed on the lower part of the liquid crystal layer with a high concentration of chiral dopant are more twisted thus narrowing the pitch (P4).

A comparison between the pitch of the cholesteric liquid crystals of a mirror cell having a reactive layer and the pitch of the cholesteric liquid crystals of a mirror cell having a reactive layer is described below. The pitch P3 of the cholesteric liquid crystals in the region where UV light is incident on the mirror cell having reactive layers is wider than the pitch P1 of the cholesteric liquid crystal of a mirror cell having no reactive layer. Additionally, the pitch (P4) of the cholesteric liquid crystals in the region, where UV light is emitted, of a mirror cell having a reactive layer is narrower than the pitch P2 of the cholesteric liquid crystals of a mirror cell not having a reactive layer. Therefore, the reflection wavelength band according to the pitch of the cholesteric liquid crystals of a mirror cell having a reactive layer is further widened. That is, the mirror cell of the present disclosure can expand the light reflection wavelength band via diversification of the pitch of cholesteric liquid crystals by further including a reactive layer.

A reactive layer RML may be formed of the same material as that of the reactive liquid crystals RM described above. However, any material belonging to the same family as an acrylate-based or methacrylate-based material may be used as the material for the reactive layer RML although the material may not be completely identical to that of the reactive liquid crystals RM.

The reactive layer RML has a thickness of 0.1 µm to 3 µm. In particular, when the reactive layer RML has a thickness of 0.1 µm or more, it can expand a light reflection band by gathering reactive liquid crystals RM of the liquid crystal layer CLL. Additionally, when the reactive layer RML has a thickness of 3 µm or less, the haze characteristics of the mirror cell 400 can be prevented from being degraded due to the reactive liquid crystals RM.

The reactive layer RML of the present disclosure may be formed in various structures.

Figure 14:
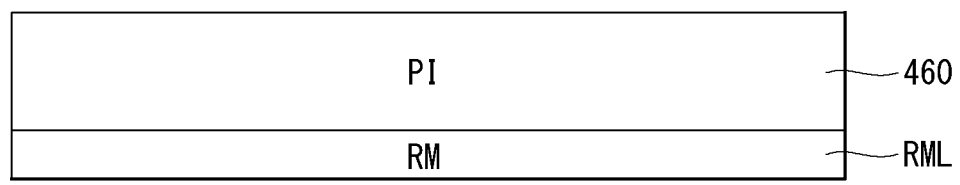
FIGS. 14 to 17 show various structures illustrating a reactive layer of the present disclosure.

Referring to FIG. 14, as described in FIG. 12, the reactive layer RML may be disposed on the lower surface of the upper alignment film 460, but may be formed of only the reactive liquid crystals RM.

Figure 15:
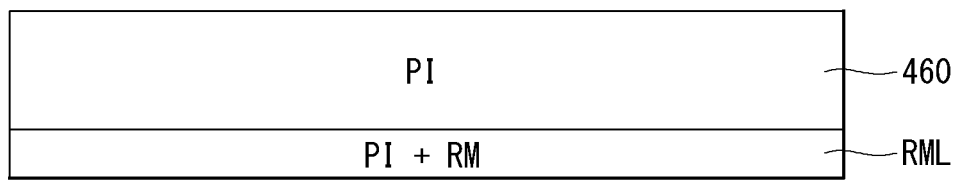

Meanwhile, referring to FIG. 15, the reactive layer RML may be formed by mixing an alignment film material PI and reactive liquid crystals RM. In particular, the reactive liquid crystals RM of the reactive layer RML may be accounted for 30 wt % to 90 wt %, and the alignment film material PI may be accounted for 10 wt % to 70 wt %. In particular, when the reactive liquid crystals RM are contained 30 wt % or more, they can expand a light reflection band by playing the role of gathering the reactive liquid crystals RM of the liquid crystal layer CLL. Additionally, when the reactive liquid crystals RM are contained less than 90 wt %, it is possible to prevent the degradation of the haze characteristics of the mirror cell due to the reactive liquid crystals RM. In this case, a rubbing process may be performed after coating the upper alignment film 460 followed by coating the reactive layer RML on top of the upper alignment film 460.

Figure 16:
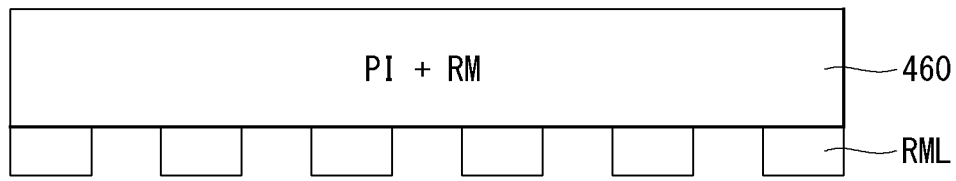

The reactive layer RML shown in FIGS. 14 and 15 may be formed in a layer form or in a pattern form as shown in FIG. 16. When the reactive layer RML is formed in a pattern form, the reactive liquid crystals RM gather in a region where a reactive layer RML is present and is distributed less in a region without the reactive layer RML. The cholesteric liquid crystals can expand the light reflection range via diversification of the pitch of the cholesteric liquid crystals by widening or narrowing the pitch according to the distribution of the reactive liquid crystals RM. The pattern of the reactive layer RML may be formed of a regular or irregular structure such as a dot-type, a line-type, etc.

Figure 17:
Figure 18:
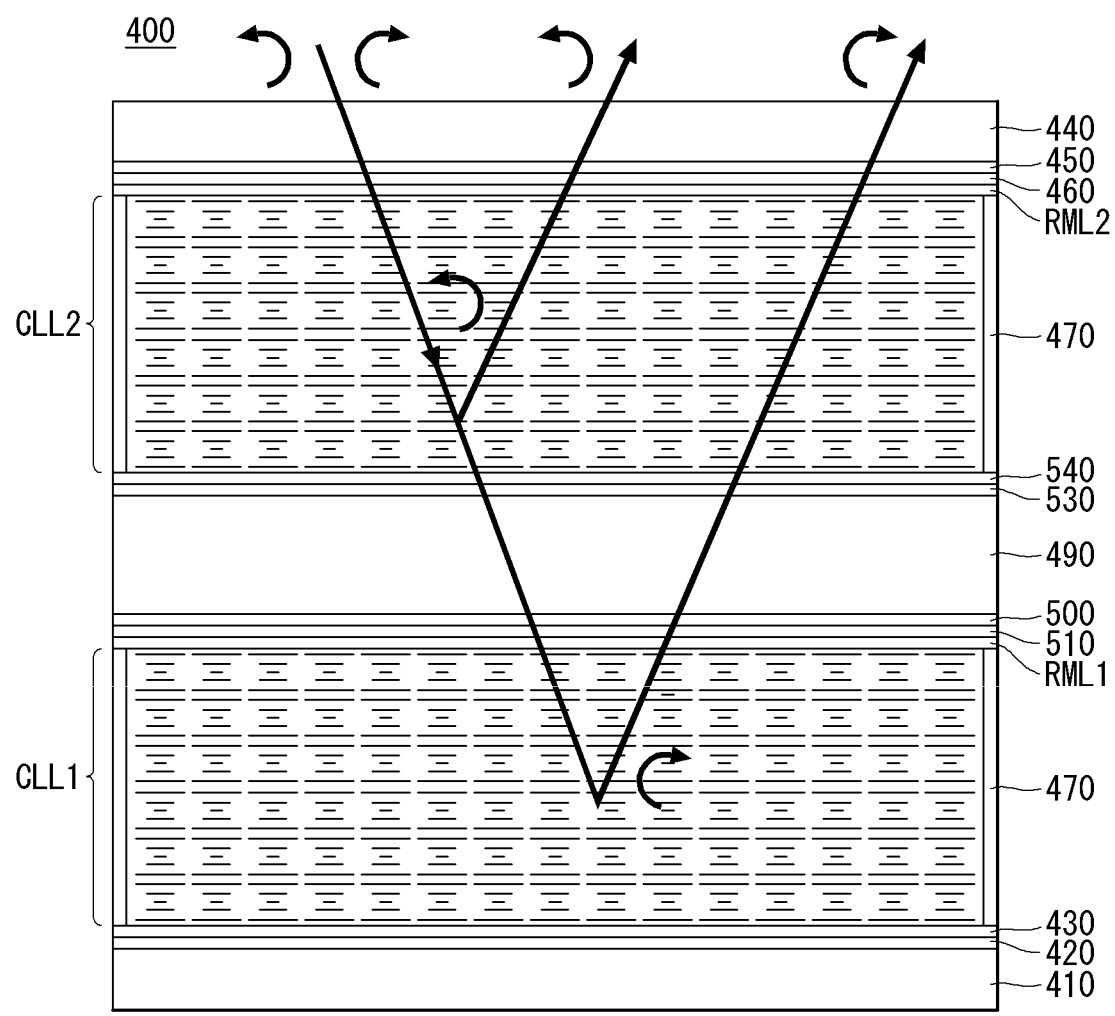
FIG. 18 shows a cross-sectional view illustrating a mirror cell having a two-layered structure according to another exemplary embodiment of the present disclosure.

Meanwhile, referring to FIG. 17, an upper alignment film 460 may include a reactive liquid crystals RM. That is, the upper alignment film 460 may be formed by mixing an alignment film material PI and reactive liquid crystals RM. In particular, the reactive liquid crystals RM of the upper alignment film 460 may be accounted for 10 wt % to 50 wt %, and an alignment film material PI may be accounted for 50 wt % to 90 wt %. In particular, when the reactive liquid crystals RM are contained 10 wt % or more, they can expand a light reflection band by playing the role of gathering the reactive liquid crystals RM of the liquid crystal layer CLL. Additionally, when the reactive liquid crystals RM are contained less than 50 wt %, it is possible to prevent the degradation of the haze characteristics of the mirror cell due to the reactive liquid crystals RM. In this case, the rubbing process upper alignment film 460 may be prepared by performing a rubbing process after mixing and coating the alignment film material PI and the reactive liquid crystals RM.

Meanwhile, for increasing the reflectance of the mirror cell 400 of the present disclosure, it is necessary to reflect the left-circularly polarized light and the right-circularly polarized light.

Referring to FIG. 18, in the mirror cell 400 of the present disclosure, the lower electrode 420 and the lower alignment film 430 are disposed on the lower substrate 410. The middle substrate 490 which opposes the lower substrate 410 is disposed and the first middle electrode 500 is disposed on the lower surface of the middle substrate 490, and the first middle alignment film 510 is disposed on the lower surface of the first middle electrode 500. The left-circularly polarized liquid crystal layer CLL1 capable of reflecting left-circularly polarized light is disposed between the lower substrate 410 and the middle substrate 490, and sealed with the sealing material 470.

A second middle electrode 530 is disposed on the upper surface of the middle substrate 490 and a second middle alignment film 540 is disposed on the second middle electrode 530. An upper substrate 440 opposing the middle substrate 490 is disposed. The upper electrode 450 is disposed on the lower surface of the upper substrate 440 and the upper alignment layer 460 is disposed on the lower surface of the upper electrode 450. A second reactive layer (RML2) is disposed on the lower surface of the upper alignment layer 460. A right-circularly polarized light liquid crystal layer CLL2 capable of reflecting right-circularly polarized light disposed between the middle substrate 490 and the upper substrate 440 is sealed with the sealing material 470.

Therefore, there are advantages in that a mirror cell having a neutral reflection color can be realized by constituting a mirror cell 400 which is provided with the right-circularly polarized liquid crystal layer CLL2 and the left-circularly polarized liquid crystal layer CLL1, and the driving voltage, production cost, and cell gap can be reduced by simplifying the stacked structure, thereby enabling the realization of a thin form.

Hereinafter, Experimental Examples of a mirror cell according to embodiments of the present disclosure will be described. The following Experimental Examples are only exemplary embodiments of the present disclosure and the present disclosure is not limited thereto.

Figure 19:
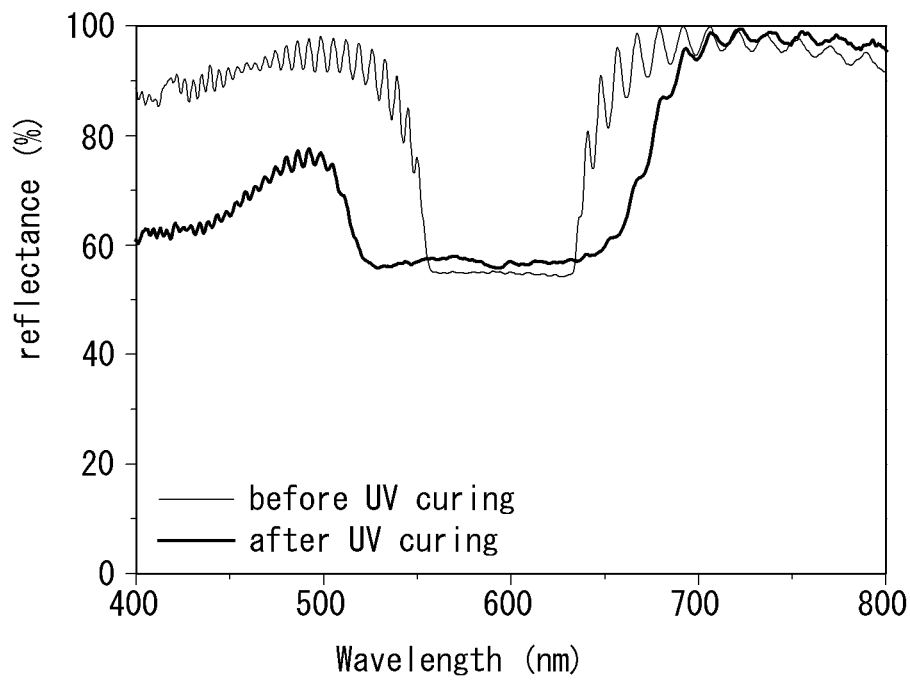
FIG. 19 shows a graph illustrating the measurement of light reflection band before/after UV curing of the mirror cell according to Example 1.
Figure 20:
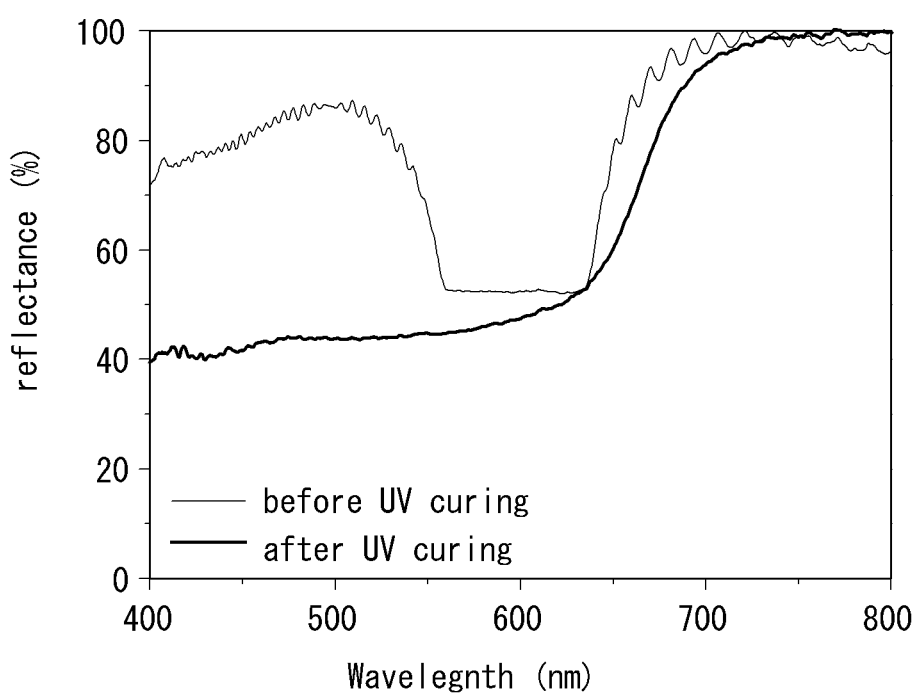
FIG. 20 shows a graph illustrating the measurement of light reflection band before/after UV curing of the mirror cell according to Example 2.

FIG. 19 shows a graph illustrating the measurement of light reflection band before/after UV curing of the mirror cell according to Example 1 and FIG. 20 shows a graph illustrating the measurement of light reflection band before/after UV curing of the mirror cell according to Example 2.

Example 1

A mixture of liquid crystals of cholesteric liquid crystals and reactive liquid crystals was coated between a lower substrate having a lower electrode and a lower alignment film and an upper substrate having an upper electrode and an upper alignment film, and then sealed with a sealing material so as to prepare a mirror cell.

Example 2

A mirror cell was prepared under the same process conditions as in Example 1 except that a reactive layer formed of the same material as the reactive liquid crystal was formed on the lower surface of the lower alignment film.

The light reflection bands before and after UV curing of the mirror cell prepared according to Examples 1 and 2 were measured and shown in FIGS. 19 and 20, respectively.

Referring to FIG. 19, the mirror cell prepared according to Example 1 showed a light reflection band of 90 nm before UV curing and the light reflection band was expanded to 160 nm after UV curing.

Referring to FIG. 20, the mirror cell prepared according to Example 2 showed a light reflection band of 90 nm before UV curing and the light reflection band was expanded to 270 nm after UV curing.

From the above results it was confirmed that a mirror cell having the same reactive layer as that of the reactive liquid crystals on the upper substrate can expand the light reflection band of the mirror cell via diversification of the pitch of cholesteric liquid crystals by forming a polymer network due to the induction of reactive liquid crystals into a reactive layer.

As described above, the display device according to exemplary embodiments of the present disclosure can improve the light reflection wavelength band via diversification of the pitch of cholesteric liquid crystals by including the reactive liquid crystals in the liquid crystal layer.

Additionally, the present disclosure provides the same reactive layer as that of reactive liquid crystals between the liquid crystal layer and the upper alignment film, and as a result, more reactive liquid crystals are gathered to the reactive layer, thereby being capable of more widely forming the pitch of the cholesteric liquid crystals in the upper part of the liquid crystal layer while more narrowly forming the pitch of the cholesteric liquid crystals in the lower part of the liquid crystal layer. Accordingly, the light reflection wavelength band can be further improved by diversifying the pitch of the cholesteric liquid crystals.

Additionally, the present disclosure has an advantage in that the stacking structure can be simplified and the driving voltage, production cost, and cell gap can be reduced, by reflecting all of the wavelength band of visible light by diversification of the pitch of cholesteric liquid crystals, thereby enabling the realization of a thin form.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A mirror cell, comprising:
a lower substrate, which includes a lower alignment film and a lower electrode;
an upper substrate, which opposes the lower substrate and includes an upper alignment film and an upper electrode;
a liquid crystal layer, which is disposed between the lower alignment film and the upper alignment film and includes a cholesteric liquid crystal and a reactive liquid crystal; and
a reactive layer, which is disposed between the upper alignment film and the liquid crystal layer and includes a same kind of reactive liquid crystals as the reactive liquid crystal in the liquid crystal layer,
wherein the reactive layer comprises an alignment film material and the reactive liquid crystals.

2. The mirror cell of claim 1, wherein the reactive layer is disposed in the form of a layer or pattern.

3. The mirror cell of claim 1, wherein the reactive layer includes the reactive liquid crystals in an amount within a range from 30 wt % to 90 wt %, inclusive, relative to the reactive layer.

4. The mirror cell of claim 1, wherein the reactive layer has a thickness within a range from 0.1 µm to 3 µm, inclusive.

5. The mirror cell of claim 1, further comprising:
a middle substrate, which is disposed between the upper substrate and the lower substrate;
a first middle electrode, which is disposed on a lower surface of the middle substrate;

a first middle alignment film, which is disposed on a lower surface of the first middle electrode;

a second middle electrode, which is disposed on an upper surface of the middle substrate; and a second middle alignment film, which is disposed on an upper surface of the second middle electrode.

6. The mirror cell of claim 5, wherein:

the liquid crystal layer includes a left-circularly polarized liquid crystal layer that reflects left-circularly polarized light and a right-circularly polarized liquid crystal layer that reflects right-circularly polarized light;

the reactive layer includes a first reactive layer disposed on a lower surface of the first middle alignment film and a second reactive layer disposed on a lower surface of the upper alignment film; and the left-circularly polarized liquid crystal layer is disposed between the first reactive layer and the lower alignment film and the right-circularly polarized liquid crystal layer is disposed between the second reactive layer and the second middle alignment film.

7. A display device, comprising:

a display panel; and a mirror cell disposed on the display panel and operable in a reflective mode and a transmissive mode, wherein the mirror cell includes:

a lower substrate, which includes a lower alignment film and a lower electrode;

an upper substrate, which opposes the lower substrate and includes an upper alignment film and an upper electrode;

a liquid crystal layer, which is disposed between the lower alignment film and the upper alignment film and includes a cholesteric liquid crystal and a reactive liquid crystal; and a reactive layer, which is disposed between the upper alignment film and the liquid crystal layer and includes a same kind of reactive liquid crystals as the reactive liquid crystal in the liquid crystal layer, wherein the reactive layer comprises an alignment film material and the reactive liquid crystals.

* * * * *